United States Patent
Shimizu

(10) Patent No.: US 10,451,520 B2
(45) Date of Patent: Oct. 22, 2019

(54) OPTICAL PROBE, INSPECTION DEVICE, AND INSPECTION METHOD

(71) Applicant: NEC Corporation, Minato-ku, Tokyo (JP)

(72) Inventor: Takanori Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/422,954

(22) PCT Filed: Aug. 27, 2013

(86) PCT No.: PCT/JP2013/072854
§ 371 (c)(1),
(2) Date: Feb. 20, 2015

(87) PCT Pub. No.: WO2014/034655
PCT Pub. Date: Mar. 6, 2014

(65) Prior Publication Data
US 2015/0211960 A1    Jul. 30, 2015

(30) Foreign Application Priority Data
Aug. 31, 2012   (JP) ................................. 2012-191648

(51) Int. Cl.
*G01M 11/00*    (2006.01)
*G02B 6/124*    (2006.01)
(Continued)

(52) U.S. Cl.
CPC ............ *G01M 11/33* (2013.01); *G01M 11/35* (2013.01); *G02B 6/02057* (2013.01);
(Continued)

(58) Field of Classification Search
CPC ...... G02B 6/34; G02B 6/02057–02209; G02B 6/124
See application file for complete search history.

(56) References Cited

U.S. PATENT DOCUMENTS 6,766,078 B1   7/2004  Canning
7,113,674 B2 *  9/2006  Ohta .................. G02B 6/02085
                                                                    385/15
(Continued)

FOREIGN PATENT DOCUMENTS

EP        1207140 A1 *  5/2002  .......... C03B 37/026
JP     H11-304837 A     11/1999
(Continued)

OTHER PUBLICATIONS

L. Zimmermann et al., "How to bring nanophotonics to application—silicon photonics packaging", IEEE LEOS Newsletter, Dec. 2008, pp. 4-14.

(Continued)

*Primary Examiner* — Violeta A Prieto

(57) ABSTRACT

Provided is an optical probe that includes an optical waveguide having a core layer and a cladding layer formed so as to cover the core layer, and a support member that supports an end portion of the optical waveguide. In the core layer, an optical waveguide core and a diffraction grating are provided. The diffraction grating is provided at an end of the optical waveguide core, has an input/output surface through which light is output to the outside or input from the outside, and converts the optical axis direction in a range between a light propagation direction in which light is propagated through the optical waveguide core and the input/output direction of light to/from the input/output surface. The support member supports the diffraction grating in such a manner that the input/output surface faces toward a predetermined direction.

12 Claims, 14 Drawing Sheets

(51) Int. Cl.
*G02B 6/02* (2006.01)
*G02B 6/34* (2006.01)
*G02B 6/122* (2006.01)

(52) U.S. Cl.
CPC ............... *G02B 6/124* (2013.01); *G02B 6/34* (2013.01); *G02B 6/1228* (2013.01)

(56) References Cited

U.S. PATENT DOCUMENTS

| | | | | |
|---|---|---|---|---|
| 2001/0046352 | A1* | 11/2001 | Ohta | G02B 6/02085 385/50 |
| 2004/0165637 | A1* | 8/2004 | Bullington | G02B 6/34 372/50.11 |
| 2004/0208451 | A1* | 10/2004 | Grunnet-Jepsen | G02B 6/02085 385/47 |
| 2005/0018966 | A1* | 1/2005 | Sasaki | G02B 6/02152 385/37 |
| 2005/0147349 | A1* | 7/2005 | Ohta | G02B 6/02085 385/37 |
| 2008/0158486 | A1* | 7/2008 | Kim | G02F 1/133555 349/106 |
| 2009/0003762 | A1* | 1/2009 | Chiniwalla | G02B 6/1228 385/14 |
| 2013/0121639 | A1 | 5/2013 | Shimizu | |
| 2015/0153512 | A1* | 6/2015 | Grote | G02F 1/0147 385/42 |
| 2015/0286008 | A1* | 10/2015 | Shimizu | G02B 6/34 385/37 |

FOREIGN PATENT DOCUMENTS

| | | |
|---|---|---|
| JP | 2001-318116 A | 11/2001 |
| JP | 2003-505713 A | 2/2003 |
| JP | 2008-134211 A | 6/2008 |
| JP | 2009-217066 A | 9/2009 |
| JP | 2010-139483 A | 6/2010 |
| JP | 2011-107384 A | 6/2011 |
| JP | 2011-145628 A | 7/2011 |
| WO | 01/06279 A1 | 1/2001 |
| WO | 2012/011370 A1 | 1/2012 |

OTHER PUBLICATIONS

T. Suhara et al., "Integrated Optics Components and Devices Using Periodic Structures", IEEE Journal of Quantum Electronics, vol. QE22, No. 6, pp. 845-867, Jun. 1986.
International Search Report for PCT Application No. PCT/JP2013/072854, dated Dec. 3, 2013.
Japanese Office Action for JP Application No. 2014-533017 dated Mar. 28, 2017 with English Translation.
Japanese Office Action for JP Application No. 2014-533017 dated Oct. 24, 2017 with English Translation.

* cited by examiner

OPTICAL PROBE, INSPECTION DEVICE, AND INSPECTION METHOD This application is a National Stage Entry of PCT/JP2013/072854 filed on Aug. 27, 2013, which claims priority from Japanese Patent Application 2012-191648 filed on Aug. 31, 2012, the contents of all of which are incorporated herein by reference, in their entirety.

TECHNICAL FIELD

The present invention relates to an optical probe, an inspection device, and an inspection method that are used to inspect optical characteristics of an optical circuit formed on a wafer.

BACKGROUND ART

Optical evaluation of a planar lightwave circuit (PLC) is conducted by connecting an optical fiber to an optical waveguide of the planar lightwave circuit and causing light to enter the optical waveguide from the outside via this optical fiber. In this case, conventionally, a refractive index of the optical waveguide is adjusted to that of the optical fiber, and an end surface of the optical waveguide is directly connected to a flat end surface of the optical fiber. Although a gap occurs between the end surface of the optical waveguide and the end surface of the optical fiber due to roughness of the connection surface, scattering of light from a boundary between the optical waveguide and the optical fiber is prevented by providing matching oil between the end surfaces.

By the way, along with development of silicon photonics, a silicon wire waveguide in which silicon is used as a core and silicon dioxide is used as a clad has come to be used in a PLC, as described in Patent Literature 1 (PTL1). Since a minimum bend radius can be made small in a silicon wire waveguide, a large number of optical integrated circuit chips each having an optical waveguide can be disposed on a single silicon wafer.

However, in conventional optical evaluation of a PLC, it is necessary to cut an end surface of an optical waveguide into chips by a method such as dicing and conduct measurement for each measured portion by bringing an end surface of an optical fiber into contact with the end surface of the optical waveguide.

Since the width of a silicon wire waveguide is approximately ⅟10 of that of an optical fiber, a large refractive index difference exists between the optical fiber and the silicon wire waveguide. Therefore, a lensed fiber, i.e., an optical fiber whose tip has a lens shape, is also used in order to surely achieve optical coupling between the optical fiber and the silicon wire waveguide.

This, however, necessitates a troublesome process of aligning the optical fiber and the silicon wire waveguide with high alignment accuracy.

In view of this, PTL 1 and Non-Patent Literature 1 (NPL1) disclose an arrangement in which a diffraction grating is formed within a plane of a silicon wafer, and optical evaluation of an optical circuit is conducted by causing an optical fiber to input/output light to/from this diffraction grating. More specifically, the optical fiber is provided so as to face the diffraction grating at an inclination of approximately 10° with respect to a direction perpendicular to a surface of the silicon wafer, and light is input/output to/from the tip of the optical fiber from/to the diffraction grating.

CITATION LIST

Patent Literature

[PTL 1] Japanese Patent Application Laid-Open No. 2011-107384

Non Patent Literature

[NPL 1] L. Zimmermann et al., IEEE LEOS NEWSLETTER, December 2008, pp. 4-14

SUMMARY OF INVENTION

Technical Problem

However, according to the arrangement described in PTL 1, it is necessary to accurately adjust a relative position between an optical fiber and a silicon wafer in an XY direction parallel with a surface of the silicon wafer, a relative position between the optical fiber and the silicon wafer in a Z direction perpendicular to the surface of the silicon wafer, and an inclination angle of the optical fiber with respect to the Z direction.

Since a large number of optical integrated circuits are disposed on a silicon wafer in high density, there is room for improvement in efficiently and surely conducting inspection of these optical integrated circuits.

An object of the present invention is to provide an optical probe, an inspection device, and an inspection method that can efficiently and surely inspect optical circuits formed on a silicon wafer in high density.

Solution to Problem

The present invention provides an optical probe for inspecting optical characteristics of an optical circuit formed in an object to be inspected. The optical probe includes an optical waveguide having a core layer and a cladding layer that covers the core layer; and a support member that supports an end portion of the optical waveguide. The core layer of the optical waveguide is provided with an optical waveguide core that propagates light and a diffraction grating. The diffraction grating is provided at an end of the optical waveguide core, has an input/output surface through which light is output to the outside or input from the outside, and changes a direction of an optical axis in a range between a direction of the light propagated by the optical waveguide core and a direction of input/output of the light to/from the input/output surface. The support member supports the diffraction grating so that the input/output surface is directed toward a predetermined direction.

The present invention also provides an inspection device including the optical probe; a stage having a support surface that is parallel with the input/output surface of the diffraction grating and supports the object to be inspected; a moving mechanism that allows the stage and the optical probe to be movable relative to each other within a plane parallel with the support surface; and an advancing/retracting mechanism that advances/retracts the optical probe closer to/away from the support surface.

The present invention also provides an inspection method for inspecting, by using the optical probe, an object to be inspected in which a diffraction grating of an optical circuit is provided at both an input end and an output end of the optical circuit. The inspection method includes bringing the diffraction grating of the optical probe into contact with a surface of the object to be inspected at positions that face at least the diffraction grating of the optical circuit on the input end of the optical circuit; inputting light from the optical waveguide of the optical probe to the diffraction grating of the optical circuit through the diffraction grating; and evaluating optical characteristics of the optical circuit by using light that has propagated through the optical circuit and has been output from the diffraction grating of the optical circuit at the output end.

Advantageous Effects of Invention

According to the present invention, optical characteristics of an optical circuit to be inspected can be evaluated by bringing a diffraction grating of an optical probe into contact with a diffraction grating of the optical circuit provided in the optical circuit. This makes it unnecessary to perform processes such as adjustment of an inclination angle of the optical probe, thereby making it possible to efficiently and surely inspect optical circuits that are formed in high density on a silicon wafer.

DESCRIPTION OF EMBODIMENTS

The best modes for carrying out an optical probe, an inspection device, and an inspection method according to the present invention are described below with reference to the attached drawings. However, the present invention is not limited only to these exemplary embodiments.

(First Exemplary Embodiment)

Figure 1:
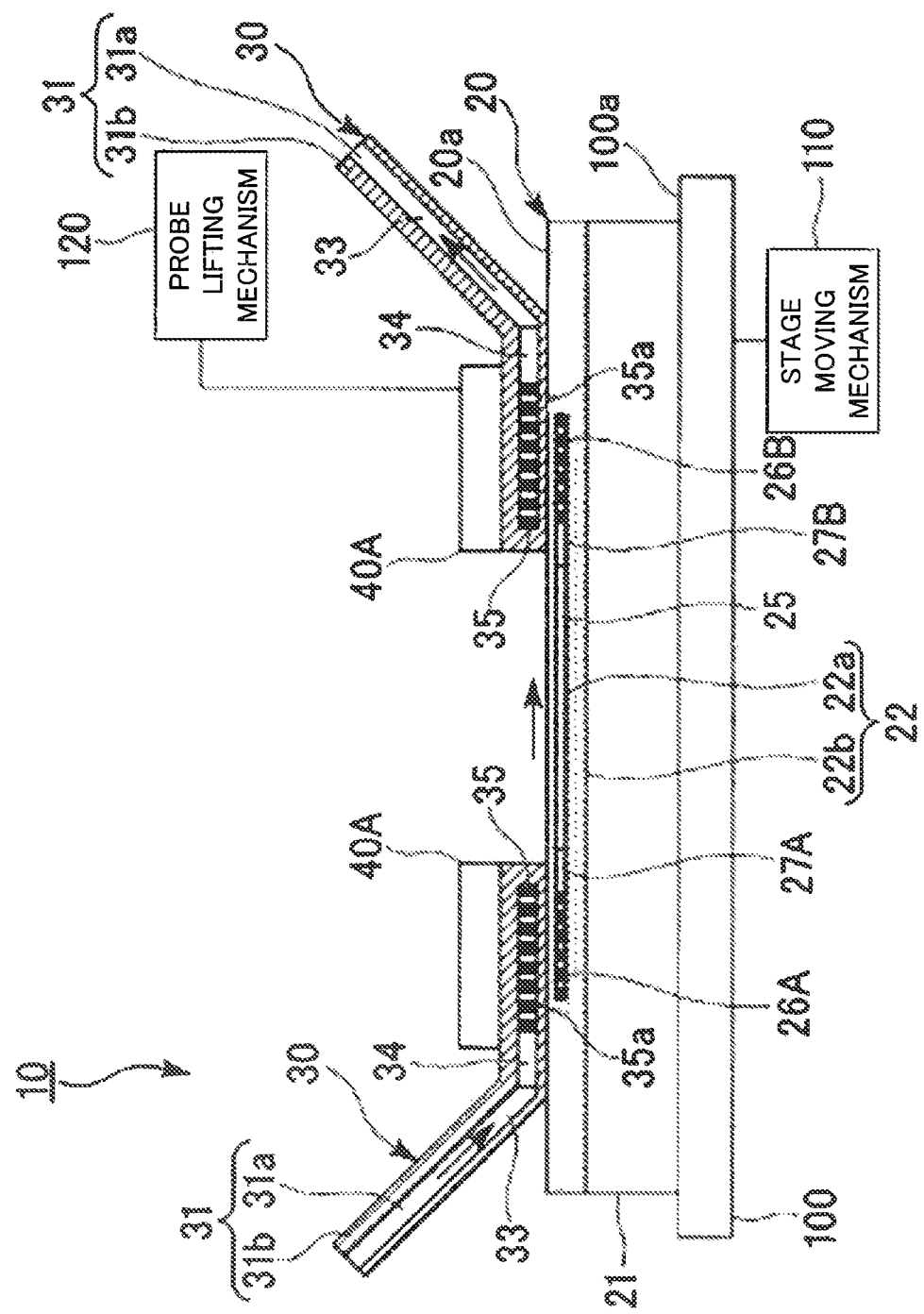
FIG. 1 is a cross-sectional view illustrating a configuration of an inspection device according to a first exemplary embodiment of the present invention.

FIG. 1 is a view schematically illustrating a configuration of an inspection device 10 for inspecting a measured wafer (an object to be inspected) 20.

In the inspection device 10, an optical waveguide (an optical circuit) 22 of the measured wafer 20 is inspected by bringing an optical probe 30 into contact with a surface of the measured wafer 20.

The measured wafer 20 to be inspected has a wafer substrate 21 made of a material such as silicon and one or more optical waveguides 22 formed on each of a large number of optical integrated circuits (chips) formed on the wafer substrate 21. The measured wafer 20 generally has a circular shape, but may be cut into pieces.

The wafer substrate 21 may be a silicon-on-insulator (SOI) substrate.

The optical waveguide 22 has a core layer 22a made of a material such as silicon and a cladding layer 22b made of a material such as silicon dioxide that covers the core layer 22a.

The core layer 22a has an optical waveguide core 25 that has a wire shape, diffraction gratings (diffraction gratings of the optical circuit) 26A and 26B provided at both ends of the optical waveguide core 25, and tapered waveguide cores 27A and 27B.

The diffraction gratings 26A and 26B have, for example, a rectangular shape in plan view and are provided at both ends (an input end and an output end) of the optical waveguide core 25. The diffraction gratings 26A and 26B have a larger width than the width of the optical waveguide core 25 in a width direction of the optical waveguide core 25 in order to increase coupling tolerance in the width direction of the optical waveguide core 25.

The diffraction gratings 26A and 26B diffract light propagated in a direction parallel with a surface 20a of the measured wafer 20 by the optical waveguide core 25 and the tapered waveguide cores 27A and 27B so as to change a direction of an optical axis of the light to an upward direction with respect to the wafer substrate 21. Thus, the light is emitted from the surface 20a. Similarly, the diffraction gratings 26A and 26B change a direction of an optical axis of light that is incident from the outside by diffraction so as to direct the light toward a direction in which the tapered waveguide cores and the optical waveguide core connected to the diffraction gratings are continuous.

The tapered waveguide cores 27A and 27B are provided between the optical waveguide core 25 and the diffraction gratings 26A and 26B, respectively, so that a core width gradually increases in a tapered manner in a direction from the optical waveguide core 25 to the diffraction gratings 26A and 26B.

This measured wafer 20 is placed on a support surface 100a of a stage 100.

The stage 100 is movable in two directions (the X direction and the Y direction) that are perpendicular to each other within a plane parallel with the surface 20a of the measured wafer 20 by a stage moving mechanism (moving mechanism) 110. Accordingly, the position of the measured wafer 20 is movable in the X direction and the Y direction.

To inspect the optical waveguide 22 of the measured wafer 20, the optical probe 30 is brought into contact with the surface 20a of the measured wafer 20 at positions facing the diffraction gratings 26A and 26B provided at both ends of the optical waveguide 22.

The optical probe 30 includes an optical waveguide 31 and a support member 40A that supports the optical waveguide 31.

The optical waveguide 31 has a core layer 31a and a cladding layer 31b that covers the core layer 31a. The core layer 31a and the cladding layer 31b are preferably made of polymer materials or the like that have different refractive indices (the refractive index of the cladding layer 31b<the refractive index of the core layer 31a).

The core layer 31a includes an optical waveguide core 33, a tapered waveguide core 34, and a diffraction grating 35.

The tapered waveguide core 34 is provided between the optical waveguide core 33 and the diffraction grating 35 so that a core width gradually increases in a tapered manner in a direction from the optical waveguide core 33 to the diffraction grating 35.

The diffraction grating 35 has, for example, a rectangular shape in plan view and is provided at an end portion of the optical waveguide core 33 with the tapered waveguide core 34 sandwiched therebetween. This diffraction grating 35 has a larger width than the width of the optical waveguide core 33 in a width direction of the optical waveguide core 33 in order to increase coupling tolerance in the width direction of the optical waveguide core 33.

The diffraction grating 35 changes, by diffraction, a direction of an optical axis of light that is input from the outside through an input/output surface 35a or light that is output to the outside through the input/output surface 35a and a direction of an optical axis of light in a direction in which the tapered waveguide core 34 and the optical waveguide core 33 are continuous.

In a case where there is a difference in a beam diameter of diffraction light between the diffraction gratings 35 of the optical probes 30 and the diffraction gratings 26A and 26B of the measured wafer 20 that face the diffraction gratings 35, the coupling tolerance decreases. In view of this, in a case where the diffraction gratings 35 and the diffraction gratings 26A and 26B have a light focusing function, the beam diameter of diffraction light can be adjusted, and thereby the coupling tolerance can be increased.

Furthermore, the shapes of the diffraction gratings 26A, 26B, and 35 can be determined by a method such as a finite difference time domain (FDTD) method. According to the finite difference time domain method, which is a known method, a light path length changes by passage through the diffraction gratings 26A, 26B, and 35, there occurs a difference in time of arrival of the light, and the shapes of the diffraction gratings 26A, 26B, and 35 are determined by using this difference.

Furthermore, it is possible to increase the diffraction efficiency of light that has propagated through the core layers 22a and 31a by adjusting the pitch of the diffraction gratings 26A, 26B, and 35 so as to tilt an optical axis of diffraction light (for example, by approximately 10 degrees) and reduce an influence of reflection.

The light focusing function of the diffraction gratings 26 and 35 can be achieved by changing a linear concave convex structure for changing a refractive index into a curved concave convex structure, as shown in Non-Patent Literature 2 (NPL 2).

[NPL 2] T. Suhara et al., IEEE Journal of Quantum Electronics, Vol. QE22, No. 6, pp. 845-867, June 1986 (FIG. 23)

The support member 40A is provided in the optical probe 30 so as to be located on a top surface side of the diffraction grating 35 and the tapered waveguide core 34 of the optical waveguide 31. The support member 40A has a plate shape and holds the optical waveguide 31 so that the input/output surface 35a of the diffraction grating 35 of the optical waveguide 31 faces the measured wafer 20 provided on the stage 100.

The support member 40A is capable of approaching or departing from the measured wafer 20 placed on the stage 100 in a direction (the Z direction) perpendicular to the surface 20a by a probe lifting mechanism (advancing/retracting mechanism) 120 that is constituted by an actuator and the like provided in the inspection device 10. This makes it possible to bring the end portion of the optical probe 30 into contact with the surface 20a of the measured wafer 20, thereby allowing the input/output surface 35a of the diffraction grating 35 of the optical waveguide 31 supported by the support member 40A to face the diffraction grating 26A or 26B.

To inspect the measured wafer 20 by the inspection device 10 configured as above, the measured wafer 20 is placed on the stage 100, and the measured wafer 20 is fixed on the stage 100 by appropriate means such as vacuum suction or the like.

Figure 2:
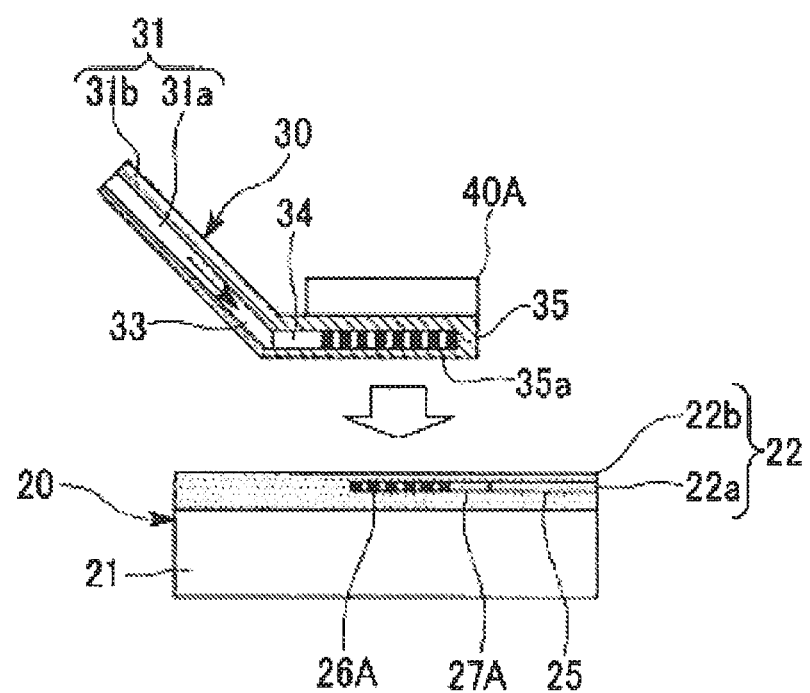
FIG. 2 is a cross-sectional view illustrating how a probe is moved closer to a measured wafer.

Then, as illustrated in FIG. 2, the stage 100 is moved by the stage moving mechanism 110 (see FIG. 1) so that the diffraction gratings 26A and 26B provided at both ends of the optical waveguide 22 of the measured wafer 20 are moved to positions that face the respective diffraction gratings 35 of the optical probes 30.

Next, the support members 40A of the respective optical probes 30 are moved toward the surface 20a of the measured wafer 20.

Then, as illustrated in FIG. 1, the end portions of the optical probes 30 are moved to contact the surface 20a of the measured wafer 20 at positions that face the diffraction gratings 26A and 26B.

Then, light is input from a light source (not illustrated) such as an external light-emitting element to the measured wafer 20 via the optical waveguide core 33 of one of the optical probes 30 (for example, the optical probe 30 that faces the diffraction grating 26A). The optical axis of the light propagated through the optical waveguide core 33 is changed by the diffraction grating 35 so that the light is output in a direction of the measured wafer 20 that faces this diffraction grating 35.

The output light reaches the diffraction grating 26A on one end side of the optical waveguide 22 of the measured wafer 20. The direction of the optical axis of the light is changed by the diffraction grating 26A so that the light is propagated to the optical waveguide core 25 via the tapered waveguide core 27A.

The light propagated by the optical waveguide core 25 passes the tapered waveguide core 27B, and then the direction of the optical axis of the light is changed again by the diffraction grating 26B. Then, the light is output toward the other one of the optical probes 30 that faces this diffraction grating 26B.

The light output from the diffraction grating 26B on the other end side of the optical waveguide 22 of the measured wafer 20 reaches the diffraction grating 35 of the optical probe 30. The direction of the optical axis of the light is changed by the diffraction grating 35 so that the light is propagated to the optical waveguide core 33 via the tapered waveguide core 34. Then, the light is propagated by the optical waveguide core 33, and values of predetermined parameters such as a loss are evaluated in an evaluation section provided in the inspection device 10.

This completes inspection of the optical waveguide 22 formed in the measured wafer 20.

Since a plurality of optical waveguides 22 are formed in the measured wafer 20, the above operations such as movement of the stage 100, contact of the optical probe 30 with the measured wafer 20, and evaluation of the optical waveguide 22 are repeated in sequence for each of the optical waveguides 22.

Furthermore, there is a case where the optical waveguide 22 has a branch path. In this case, three or more input/output sections that input/output light to/from the optical waveguide 22 are provided. In such a case, the optical waveguides 22 may be concurrently inspected by preparing three or more optical probes 30 and bringing the optical probes 30 into contact with the respective input/output sections.

According to the above arrangement, each of the optical probes 30 includes the diffraction grating 35 that faces and is optically coupled to the diffraction grating 26A or 26B provided at an end of the optical waveguide 22 of the measured wafer 20. This makes it possible to inspect the optical waveguide 22 simply by bringing the diffraction gratings 35 of the optical probes 30 into contact with the diffraction gratings 26A and 26B of the measured wafer 20.

In this case, it is unnecessary to adjust an inclination angle of the optical probe 30 to the surface 20a of the measured wafer 20. It is therefore possible to easily and surely inspect the optical waveguide 22.

Furthermore, by using diffraction gratings that have a light focusing function as the diffraction gratings 26A, 26B, and 35, it is possible to adjust a beam diameter of diffraction light in the optical probe 30 and the measured wafer 20, thereby increasing coupling tolerance.

Furthermore, since the tolerance in the Z direction between the optical probe 30 and the surface 20a of the measured wafer 20 is increased, accurate alignment between the optical probe 30 and the measured wafer 20 in the X direction and the Y direction is substantially only needed. This makes it possible to easily and surely inspect the optical waveguide 22.

Figure 3:
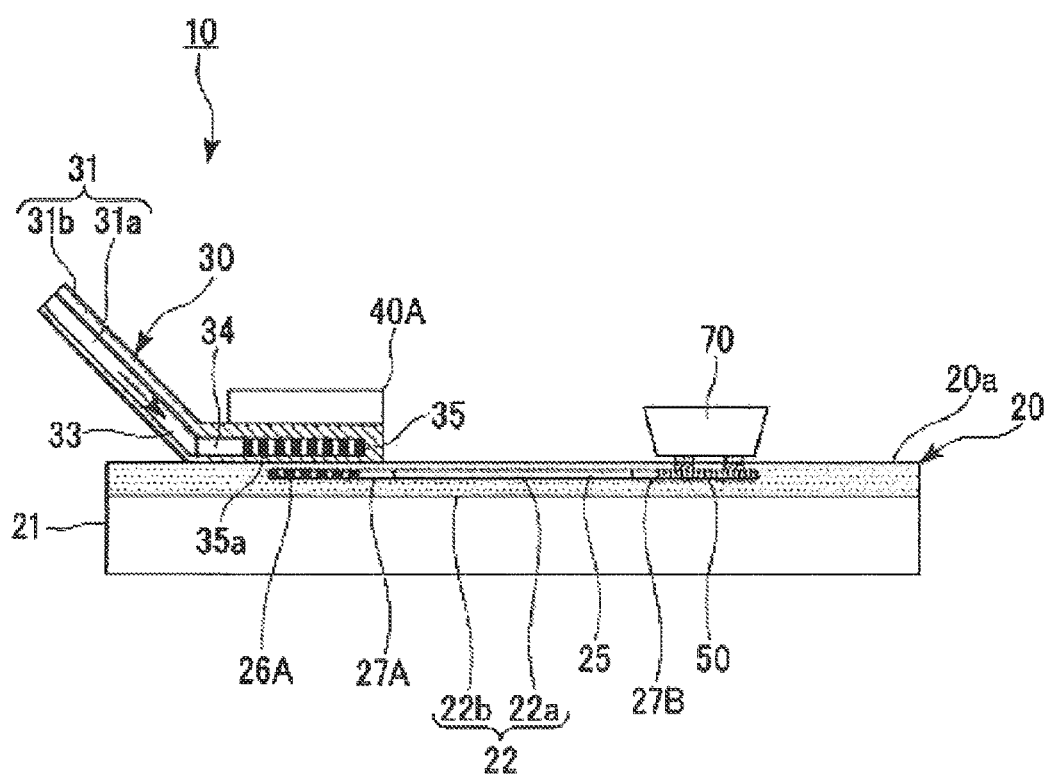
FIG. 3 is a cross-sectional view illustrating a modification of the first exemplary embodiment.

In the first exemplary embodiment, inspection is conducted by bringing the optical probe 30 into contact with each of the diffraction gratings 26A and 26B provided at both ends of the optical waveguide 22. However, a light receiving element 50 fabricated in the measured wafer 20 may be used instead of one of the diffraction gratings 26A and 26B, as illustrated in FIG. 3.

In this case, the optical probe 30 is brought into contact with the diffraction grating 26A at one end (an input end) of the optical waveguide 22, and inspection light is input from the optical probe 30 to the optical waveguide 22 as described in the above exemplary embodiment.

Then, the light is received by the light receiving element 50 at the other end (an output end) of the optical waveguide 22. In the light receiving element 50, the received light is converted to an electric signal corresponding to, for example the intensity of the light, and the electric signal is received by an electric prober 70 and is output to the evaluation section of the inspection device 10.

Even with such an arrangement, effects similar to those mentioned above can be obtained.

In the first exemplary embodiment, the measured wafer 20 is placed on the stage 100, the stage 100 is moved in two directions (the X direction and the Y direction) within a plane parallel with the surface 20a of the measured wafer 20, and the optical probe 30 is moved in a Z direction perpendicular to the surface 20a. However, such an arrangement is also possible that the measured wafer 20 is kept fixed, and the optical probe 30 side is moved in the X direction and the Y direction in addition to the Z direction.

Furthermore, such an arrangement is also possible that the optical probe 30 side is kept fixed, and the stage 100 is moved in three directions, i.e., the X direction, the Y direction, and the Z direction.

Furthermore, such an arrangement is also possible that an alignment mark for alignment between the optical probe 30 and the measured wafer 20 in the X direction and the Y direction that can be image-recognized is formed on the measured wafer 20 or the optical waveguide 22, and accurate alignment is automatically performed by image recognition of this alignment mark.

(Second Exemplary Embodiment)

Next, a second exemplary embodiment of the present invention is described. In the second exemplary embodiment described below, elements that are identical to those of the first exemplary embodiment are given identical reference numerals and are not explained repeatedly, and differences from the first exemplary embodiment are mainly described.

An inspection device 10 of the present exemplary embodiment is similar to that of the first exemplary embodiment except for that a plurality of sets of optical waveguide cores 33, tapered waveguide cores 34, and diffraction gratings 35 are provided as an optical waveguide 31 on a support member 40B of an optical probe 30.

Figure 4:
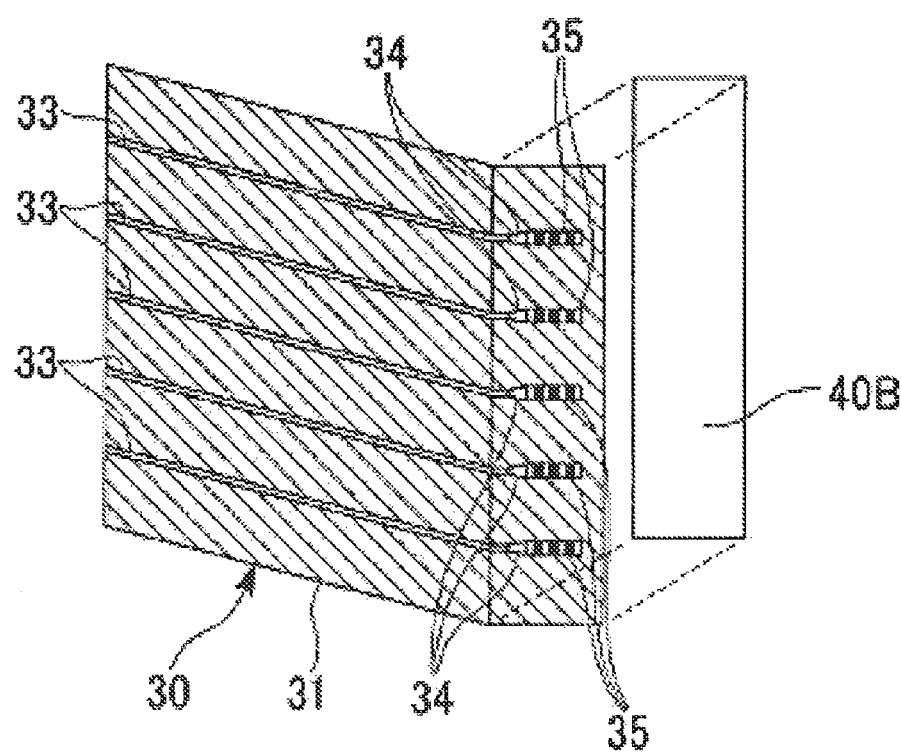
FIG. 4 is an exploded perspective view illustrating a configuration of a probe according to a second exemplary embodiment of the present invention.

As illustrated in FIG. 4, the support member 40B is formed in a band shape extending in one direction, a plurality of diffraction gratings 35 and a plurality of tapered waveguide cores 34 are provided along a longitudinal direction of this support member 40B, and linear optical waveguide cores 33 are provided so as to extend in parallel with each other to the respective tapered waveguide cores 34.

According to such an arrangement, a plurality of optical waveguides 22 in a measured wafer 20 can be concurrently evaluated by causing the plurality of sets of diffraction gratings 35 to face the optical waveguides 22. This increases the inspection efficiency, and the effects described in the first exemplary embodiment become more remarkable.

(Modifications of Second Exemplary Embodiment)

The support member 40B that supports the optical waveguide 31 including a plurality of sets of optical waveguide cores 33, tapered waveguide cores 34, and diffraction gratings 35 as described above can have a different shape as appropriate.

Figure 5:
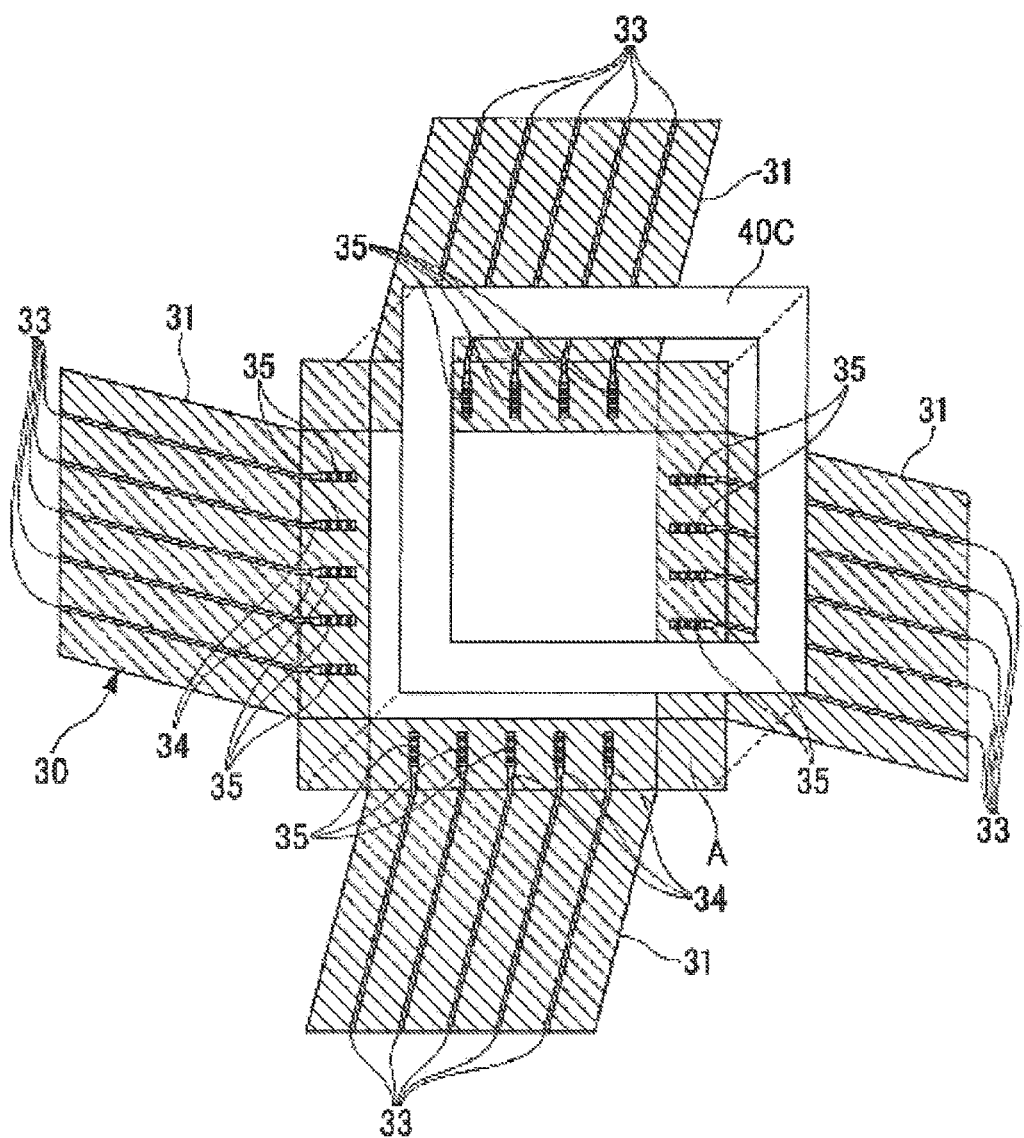
FIG. 5 is an exploded perspective view illustrating a modification of the probe according to the second exemplary embodiment of the present invention.

For example, such an arrangement is also possible that a support member 40C that has a rectangular frame shape is provided, a predetermined number of diffraction gratings 35 are disposed along an outer periphery of an exposure area A for one shot so that all optical waveguides 22 located within the exposure area A can be concurrently inspected in the measured wafer 20, and tapered waveguide cores 34 and optical waveguide cores 33 are extended from the diffraction gratings 35 toward the peripheral side of the support member 40C, as illustrated in FIG. 5.

Figure 6:
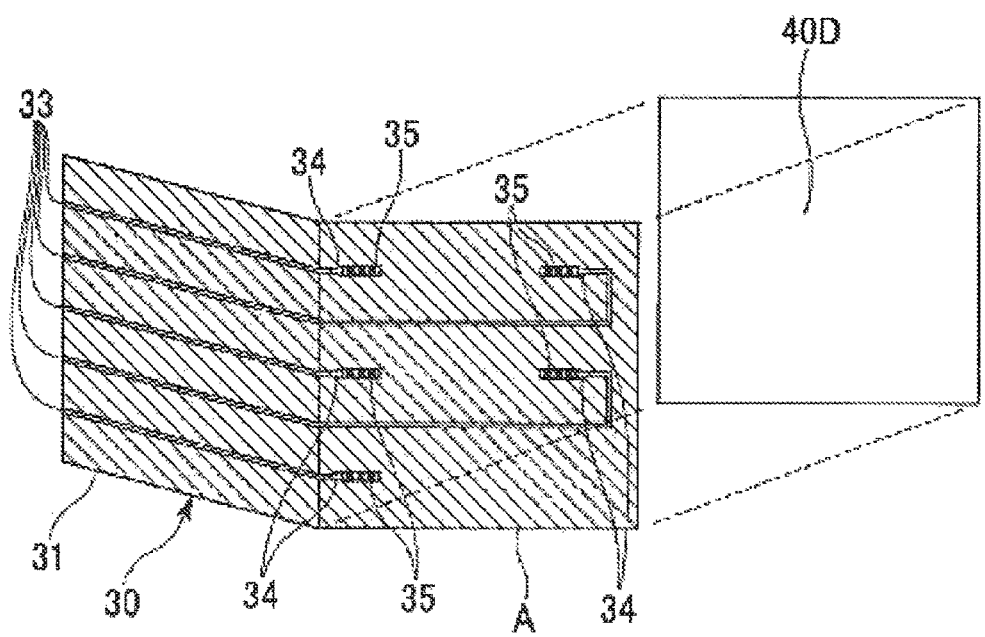
FIG. 6 is an exploded perspective view illustrating another modification of the probe according to the second exemplary embodiment of the present invention.

Alternatively, such an arrangement is also possible that a support member 40D that has, for example, a rectangular shape corresponding to the shape of an exposure area A for one shot is provided so as to cover the exposure area A, as illustrated in FIG. 6.

Figure 7:
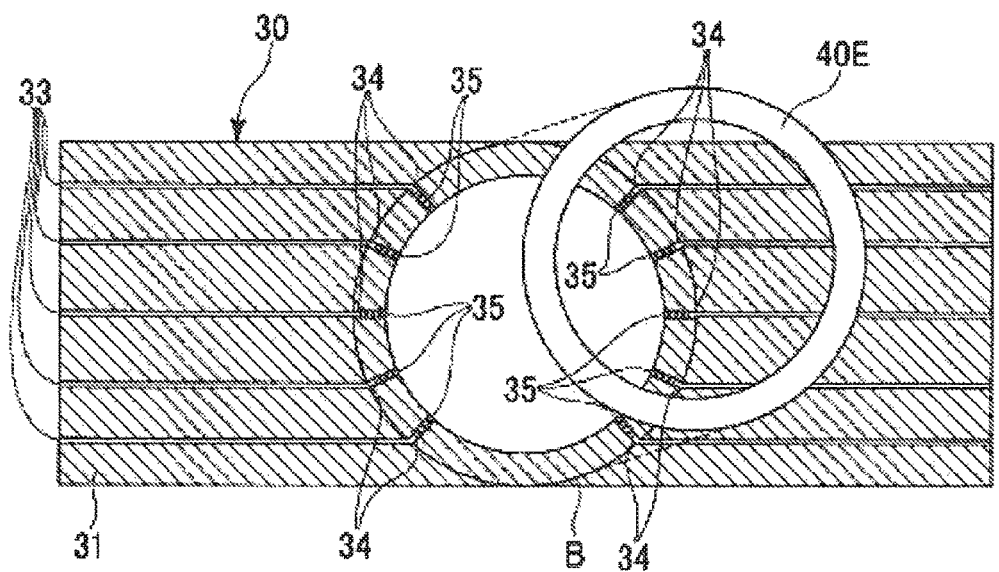
FIG. 7 is an exploded perspective view illustrating still another modification of the probe according to the second exemplary embodiment of the present invention.

Alternatively, such an arrangement is also possible that a support member 40E that has a ring shape is provided along an outer peripheral shape B of a circular measured wafer 20, and a predetermined number of diffraction gratings 35 are disposed in a circular manner, as illustrated in FIG. 7.

Figure 8:
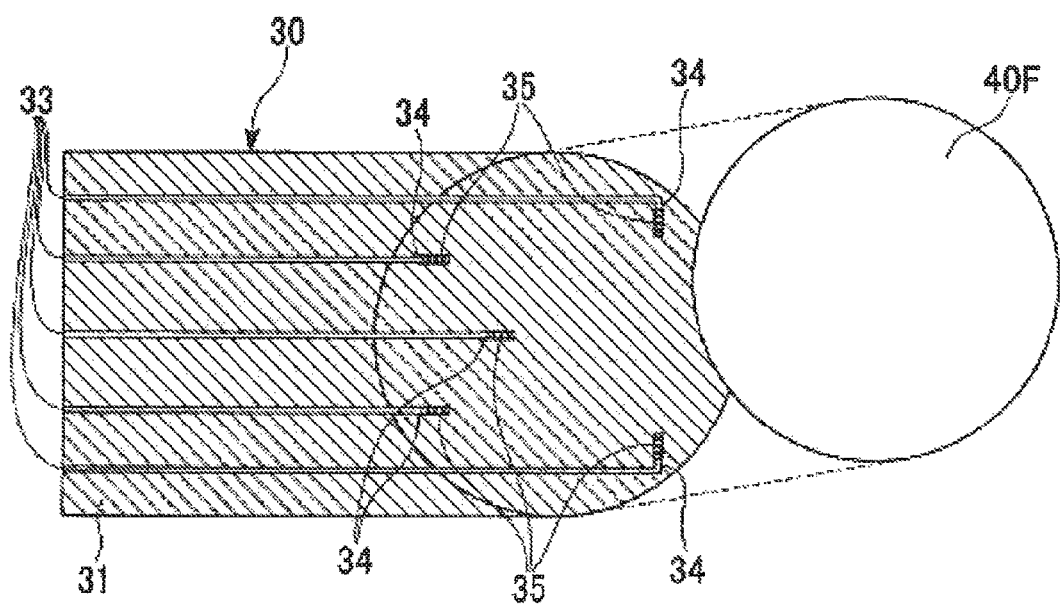
FIG. 8 is an exploded perspective view illustrating still another modification of the probe according to the second exemplary embodiment of the present invention.

Alternatively, such an arrangement is also possible that a circular support member 40F is provided so as to cover a circular measured wafer 20, as illustrated in FIG. 8.

(Third Exemplary Embodiment)

Next, a third exemplary embodiment of the present invention is described. In the third exemplary embodiment described below, elements that are identical to those of the first and the second exemplary embodiments are given identical reference numerals and are not explained repeatedly, and differences from the first exemplary embodiment are mainly described.

Figure 9A:
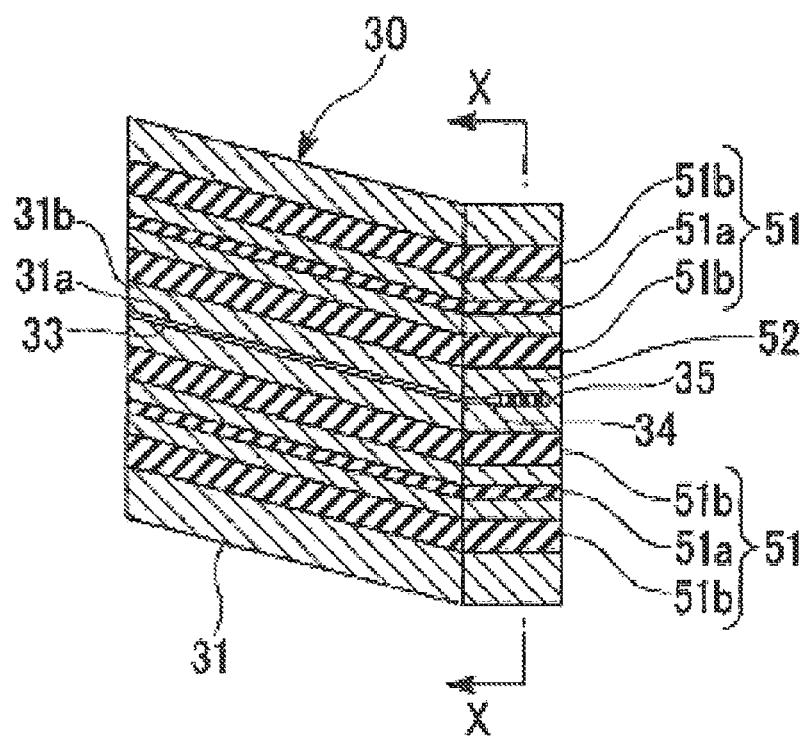
FIG. 9A is a perspective view illustrating a configuration of a probe according to a third exemplary embodiment of the present invention.
Figure 9B:
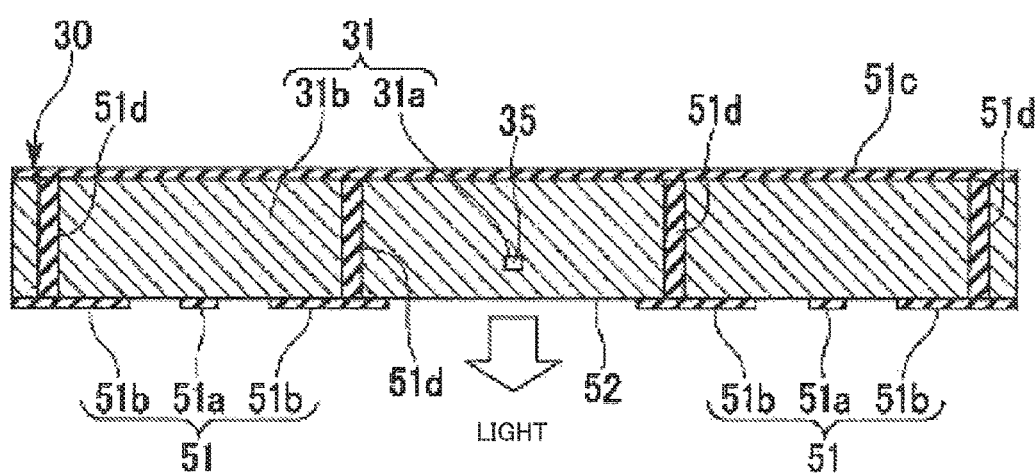
FIG. 9B is a cross-sectional view taken along the line X-X in FIG. 9A.

An inspection device 10 of the present exemplary embodiment has an arrangement in which an optical probe 30 has a transmission line 51 for an electrical signal in the vicinity of an optical waveguide 31, as illustrated in FIGS. 9A and 9B.

The transmission line 51 has a conductor 51a and a pair of conductors 51b provided on both sides of the conductor 51a on a surface of a cladding layer 31b of an optical probe 30 on the side that faces a surface 20a of a measured wafer 20 as illustrated in FIG. 1. The transmission line 51 can have, for example, a grounded coplanar line arrangement in which a ground conductor 51c is formed on the opposite side of the conductor 51b across the cladding layer 31b, and this ground conductor 51c is electrically connected to the conductor 51b via a via 51d that hollows out the cladding layer 31b.

The transmission line 51 is provided on both sides of the diffraction grating 35 so as to sandwich the diffraction grating 35. A slot (gap) 52 is formed between adjacent transmission lines 51 so that the cladding layer 31b is exposed. The diffraction grating 35 is disposed at a position that faces the slot 52, and light can be input or output through this slot 52.

Figure 10A:
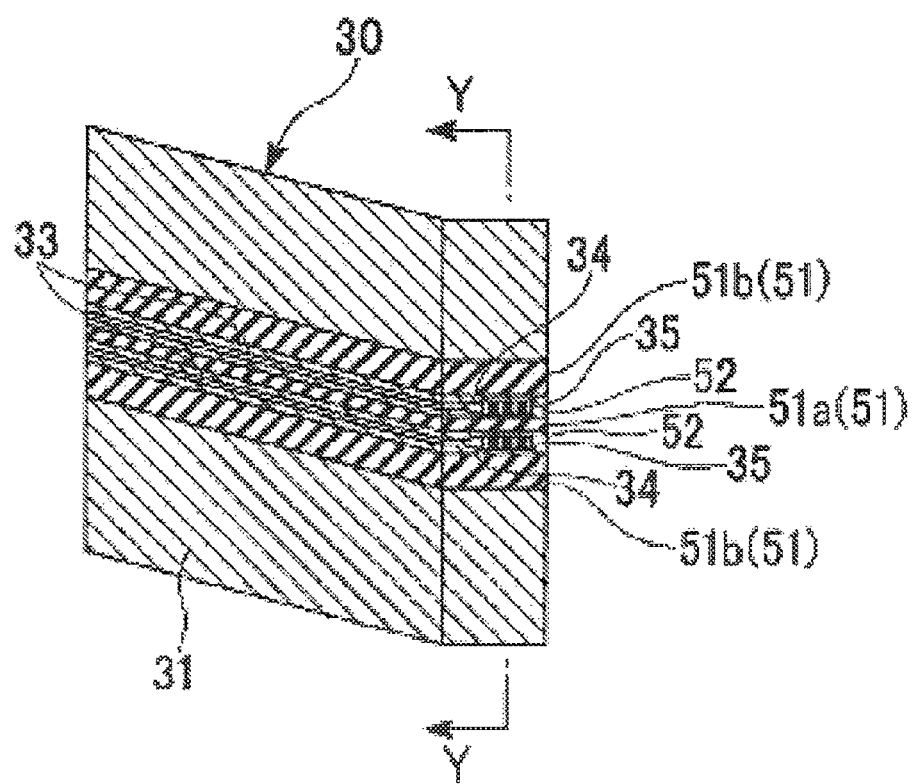
FIG. 10A is a perspective view illustrating a configuration of a modification of the probe according to the third exemplary embodiment.
Figure 10B:
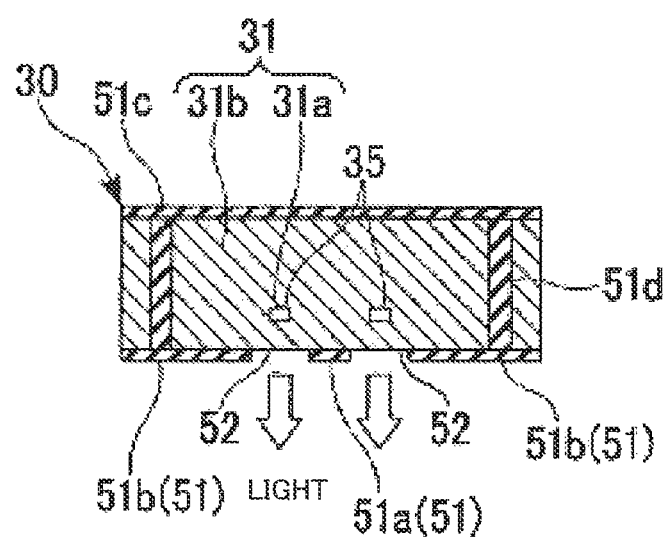
FIG. 10B is a cross-sectional view taken along the line Y-Y in FIG. 10A.

Furthermore, such an arrangement is also possible that the conductor 51a is provided between two optical waveguide cores 33, and two conductors 51b are disposed on outer sides of the two optical waveguide cores 33, as illustrated in FIGS. 10A and 10B. Also in this case, the diffraction grating 35 is provided, at a position where the cladding layer 31b is exposed, in the slot 52 formed between the conductor 51a and the conductors 51b provided on both sides of the conductor 51a.

According to such an arrangement, optical evaluation of the optical waveguide 22 can be conducted by bringing the optical probe 30 into contact with the surface 20a of the measured wafer 20 as illustrated in FIG. 1, and in addition to this, electrical evaluation (inspection) of an element provided in the optical waveguide 22 and other elements and electric circuits can be conducted by the transmission line 51.

In a case where the optical waveguide 31 and the transmission line 51 are provided in the optical probe 30, it is possible to achieve both optical coupling and electrical connection in a small space without interference between constituent members necessary for optical coupling and constituent members necessary for electrical connection.

Furthermore, in a case where the transmission line 51 is a grounded coplanar line, a high-speed (e.g., 10 Gbit/s) electric signal can be input.

In the present exemplary embodiment, the transmission line 51 is configured as a grounded coplanar line. However, the present exemplary embodiment is not limited to this. A microstrip line, another type of coplanar line, or the like can be formed as appropriate.

(Fourth Exemplary Embodiment)

Next, a fourth exemplary embodiment of the present invention is described. In the fourth exemplary embodiment described below, elements that are identical to those of the first exemplary embodiment are given identical reference numerals and are not explained repeatedly, and differences from the first exemplary embodiment are mainly described.

Figure 11:
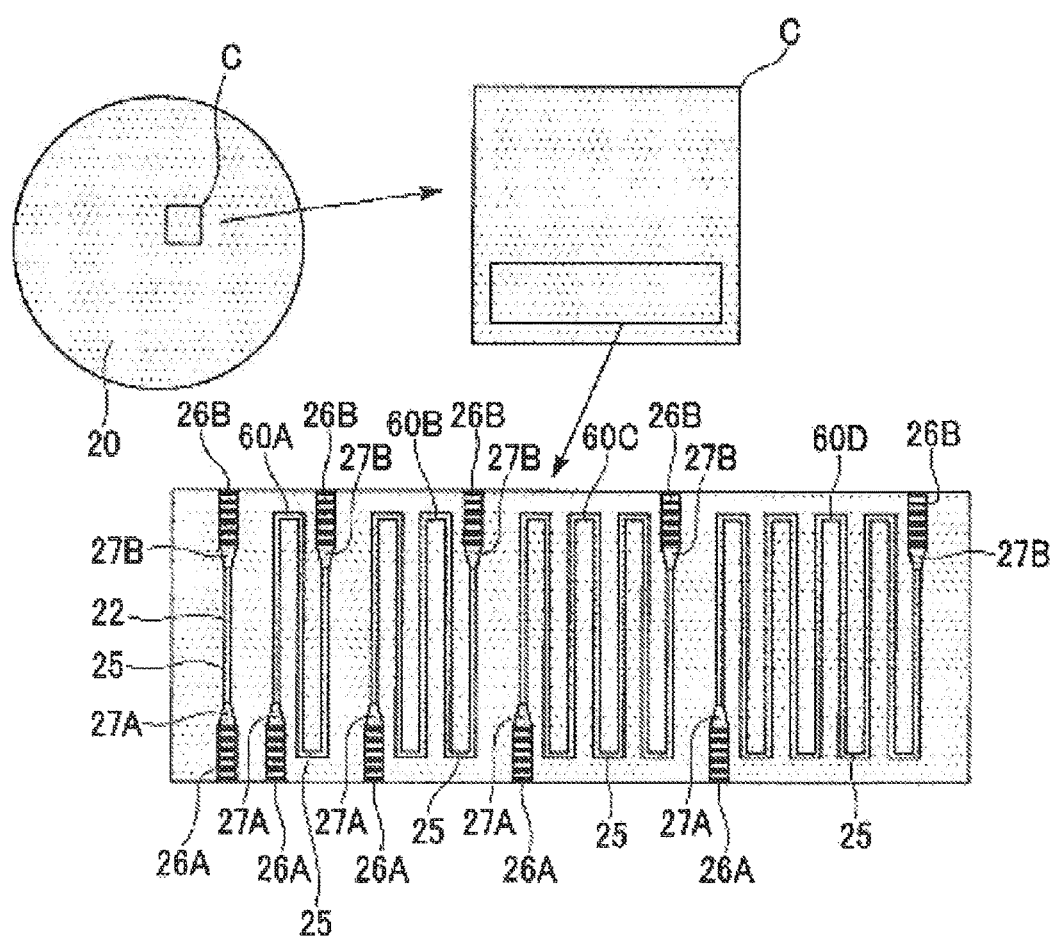
FIG. 11 is a view illustrating reference optical waveguides formed on a measured wafer according to a fourth exemplary embodiment of the present invention.

In the present exemplary embodiment, one or more reference optical waveguides 60A, 60B, . . . that have a line length different from an optical waveguide 22 are provided on each chip C (one of the chips is illustrated in FIG. 11) formed on a measured wafer 20 together with the optical waveguide 22 which is the original target of inspection, as illustrated in FIG. 11.

Each of the reference optical waveguides 60A, 60B, . . . includes diffraction gratings 26A and 26B and tapered waveguide cores 27A and 27B at both ends thereof as with the optical waveguide 22, and has an optical connection structure identical to the optical waveguide 22.

In inspecting the measured wafer 20 having such an arrangement, optical evaluation of not only the optical waveguide 22, but also the reference optical waveguides 60A, 60B, . . . is conducted as with the optical waveguide 22 by bringing diffraction gratings 35 of optical probes 30 into contact with the diffraction gratings 26A and 26B at both ends.

Figure 12:
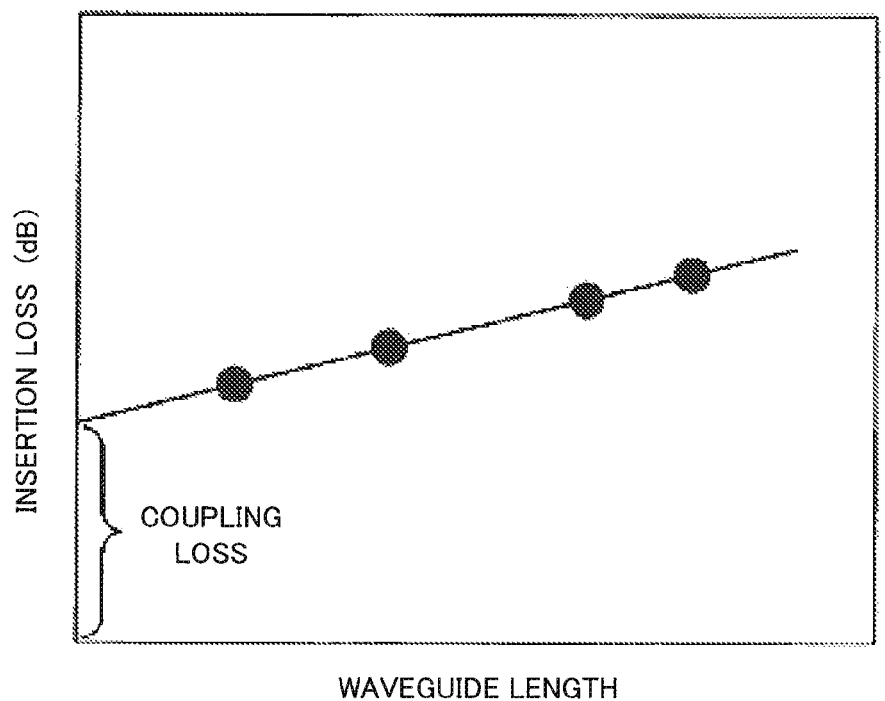
FIG. 12 is a view illustrating how a loss varies depending on the waveguide length and how a coupling loss is related with this in a case where the reference optical waveguides are used.

FIG. 12 is a view illustrating how a loss varies depending on the waveguide length and how a coupling loss is related with this in a case where such reference optical waveguides are used. As illustrated in FIG. 12, the coupling loss obtained when the waveguide length of an optical waveguide is 0 (zero) can be found by measuring losses (insertion losses) in a plurality of optical waveguides whose optical coupling parts have an identical optical connection structure and have different lengths. The relation between the waveguide length and the insertion loss is a linear function, and the inclination of the linear function is an insertion loss per waveguide of a certain length, i.e., a propagation loss.

Therefore, a loss (coupling loss) obtained when the waveguide length is 0 (zero) can be found by measuring in advance insertion losses in the reference optical waveguides 60A, 60B, . . . that have different lengths.

In inspecting the optical waveguide 22, the propagation loss in the optical waveguide 22 can be obtained by subtracting the coupling loss obtained in advance from the insertion loss of the optical waveguide 22 and correcting the obtained value (i.e., correcting the evaluation result of the optical waveguide 22).

(Other Exemplary Embodiments)

Note that the optical probe, the inspection device, and the inspection method of the present invention are not limited to the above exemplary embodiments described with reference to the drawings, and various modifications can be made within the technical scope of the present invention.

For example, in the first through the fourth exemplary embodiments, diffraction gratings that have a light focusing function are preferably used as the diffraction gratings 26A, 26B, and 35. However, it is also possible that scattering of light is prevented by disposing a diffraction grating that has a light focusing function between the diffraction gratings 26A and 26B and the diffraction gratings 35 without using diffraction gratings that have a light focusing function as the diffraction gratings 26A, 26B, and 35.

However, this complicates the structure and production steps. Furthermore, the diffraction grating having a light focusing function that is additionally provided is susceptible to scratches and stains since this diffraction grating is located on a surface of a measured wafer or a probe, and therefore there is a risk of poor yield. Meanwhile, in a case where diffraction gratings that have a light focusing function are used as the diffraction gratings 26A, 26B, and 35 as described in each of the exemplary embodiments above, occurrence of such a problem can be avoided.

Furthermore, the arrangements described in the first through the fourth exemplary embodiments can be appropriately combined.

In addition, the arrangements described in the above exemplary embodiments can be appropriately selected or changed to other ones, unless such selection or change is not deviated from the gist of the present invention.

This application is based upon and claims the benefit of priority from Japanese patent application No. 2012-191648, filed on Aug. 31, 2012, the disclosure of which is incorporated herein in its entirety by reference.

INDUSTRIAL APPLICABILITY

According to the present invention, optical characteristics of an optical circuit can be evaluated by bringing a diffraction grating of an optical probe into contact with a diffraction grating of the optical circuit provided on the optical circuit to be inspected. This makes it unnecessary to perform processes such as adjustment of an inclination angle of the optical probe, thereby making it possible to efficiently and surely inspect optical circuits that are formed in high density on a silicon wafer.

REFERENCE SIGNS LIST

10 Inspection device
20 Measured wafer (object to be inspected)
20a Surface
21 Wafer substrate
22 Optical waveguide (optical circuit)
22a Core layer
22b Cladding layer
25 Optical waveguide core
26A, 26B Diffraction grating (diffraction grating of an optical circuit)
27A, 27B Tapered waveguide core
30 Optical probe
31 Optical waveguide
31a Core layer
31b Cladding layer
33 Optical waveguide core
34 Tapered waveguide core
35 Diffraction grating
35a Input/output surface
40A to 40F Support member
50 Light receiving element
51 Transmission line
51a Conductor (first conductor)
51b Conductor (second conductor)
51c Ground conductor
51d Via
52 Slot
60A, 60B, Reference optical waveguide
70 Electrical prober
100 Stage
100a Support surface
110 Stage moving mechanism (moving mechanism)
120 Probe lifting mechanism (advancing/retracting mechanism)

What is claimed is:

1. An optical probe for inspecting optical characteristics of an optical circuit formed in an object to be inspected, the optical probe comprising:

a planar optical waveguide comprising a core that propagates light, a cladding that covers the core, and a diffraction grating provided at an end of the core; and a support member that supports an end portion of the planar optical waveguide;

wherein the diffraction grating comprises an input/output surface configured to transmit light into/out of the diffraction grating;

wherein the diffraction grating is configured to change a direction of an optical axis between a direction of the light propagated by the core and a direction of light transmitted into/out of the diffraction grating;

wherein the diffraction grating is configured to be coupled to the optical circuit such that an optical axis of light, transmitted between the input/output surface and a surface of the optical circuit to be inspected, is tilted with respect to a direction perpendicular to the input/output surface and the surface of the optical circuit to be inspected;

wherein the optical probe further comprises two transmission lines for electrical signals, provided on a surface of the cladding configured to face the optical circuit to be inspected;

wherein the two transmission lines are separated from each other with a gap therebetween which overlaps with the diffraction grating as viewed from the surface of the cladding; and wherein each of the two transmission lines comprises a first conductor and two second conductors.

2. The optical probe according to claim 1, wherein the diffraction grating includes a light focusing means that collects the light that is input/output through the input/output surface.

3. An inspection device comprising:

the optical probe according to claim 1;

a stage having a support surface that is parallel with the input/output surface of the diffraction grating and supports the object to be inspected;

a moving mechanism that allows the stage and the optical probe to be movable relative to each other within a plane parallel with the support surface; and an advancing/retracting mechanism that advances/retracts the optical probe closer to/away from the support surface.

4. The inspection device according to claim 3, comprising a pair of the optical probes, wherein the optical circuit is inspected by bringing the diffraction grating of one of the optical probes into contact with an input end of the optical circuit to be inspected that is supported on the support surface of the stage while bringing the diffraction grating of the other one of the optical probes into contact with an output end of the optical circuit by the moving mechanism and the advancing/retracting mechanism.

5. The inspection device according to claim 3, wherein a light receiving element that converts light to an electric signal is provided at the output end of the optical circuit, and the optical circuit is inspected by bringing the diffraction grating of the optical probe into the contact with an input end of the optical circuit to be inspected that is supported on the support surface of the stage by the moving mechanism and the advancing/retracting mechanism while causing the light receiving element provided at the output end of the optical circuit to output an electric signal.

6. The inspection device according to claim 3, wherein a plurality of pairs of optical probes with which a plurality of pairs of optical circuits are inspected are provided together on the support member.

7. The optical probe according to claim 1, wherein the optical waveguide further comprises a tapered waveguide core provided between the core and the diffraction grating.

8. The optical probe according to claim 7, wherein a core width of the tapered waveguide core gradually increases in a tapered manner in a direction from the core to the diffraction grating.

9. An inspection method for inspecting, by using the optical probe according to claim 1, the object to be inspected in which the diffraction grating of the optical circuit is provided at both an input end and an output end of the optical circuit, the inspection method comprising:
bringing the diffraction grating of the optical probe into contact with a surface of the object to be inspected at positions that face the diffraction grating of the optical circuit at the input end of the optical circuit;
inputting light from the diffraction grating of the optical probe to the diffraction grating of the optical circuit through the diffraction grating; and
evaluating optical characteristics of the optical circuit by using light that has propagated through the optical circuit and has been output from the diffraction grating of the optical circuit at the output end.

10. The inspection method according to claim 9, wherein the optical characteristics of the optical circuit are evaluated
by bringing the diffraction grating of the optical probe into contact with the surface of the object to be inspected at positions that face the diffraction grating of the optical circuit at the end of the optical circuit; and
by extracting light that has been output from the diffraction grating of the optical circuit at the output end.

11. The inspection method according to claim 10, wherein the object to be inspected is provided with a plurality of reference optical circuits that have an optical connection structure identical to the optical circuit and have a propagation path length different from each other, and
a loss of light in the optical circuit and a loss of light in the reference optical circuits are detected, and an evaluation result in the optical circuit is corrected by using the detection result, when the optical characteristics of the optical circuit are evaluated.

12. An optical probe for inspecting optical characteristics of an optical circuit formed in an object to be inspected, the optical probe comprising:
a planar optical waveguide comprising a first core that propagates light, a second core that propagates light, a cladding that covers the first core and the second core, a first diffraction grating provided at an end of the first core, and a second diffraction grating provided at an end of the second core; and
a support member that supports an end portion of the planar optical waveguide;
wherein the first diffraction grating and the second diffraction grating each comprise an input/output surface configured to transmit light into/out of the respective diffraction grating;
wherein the first diffraction grating and the second diffraction grating are each configured to change a direction of an optical axis between a direction of the light propagated by the respective core and a direction of light transmitted into/out of the respective diffraction grating;
wherein the first diffraction grating and the second diffraction grating are each configured to be coupled to the optical circuit such that an optical axis of light, transmitted between the respective input/output surface and a surface of the optical circuit to be inspected, is tilted with respect to a direction perpendicular to the respective input/output surface and the surface of the optical circuit to be inspected; wherein the optical probe further comprises a transmission line for an electrical signal disposed on a surface of the cladding configured to face the optical circuit to be inspected;
wherein the transmission line comprises two second conductors separated from each other with a gap therebetween which overlaps with the first diffraction grating and the second diffraction grating as viewed from the surface of the cladding; and a first conductor disposed in the gap between the two second conductors.

* * * * *